US012592350B2

(12) United States Patent
Ybanez et al.

(10) Patent No.: US 12,592,350 B2
(45) Date of Patent: Mar. 31, 2026

(54) POWER FUSE AND AIRCRAFT COMPRISING SUCH A POWER FUSE

(71) Applicant: Airbus SAS, Blagnac (FR)

(72) Inventors: Ludovic Ybanez, Blagnac (FR); Ravi Kiran Surapaneni, Blagnac (FR); Gowtham Galla, Blagnac (FR)

(73) Assignee: Airbus SAS, Blagnac (FR)

( * ) Notice: Subject to any disclaimer, the term of this patent is extended or adjusted under 35 U.S.C. 154(b) by 253 days.

(21) Appl. No.: 18/470,019

(22) Filed: Sep. 19, 2023

(65) Prior Publication Data

US 2024/0096574 A1 Mar. 21, 2024

(30) Foreign Application Priority Data

Sep. 21, 2022 (EP) .................................... 22306380

(51) Int. Cl.
*H01H 33/666* (2006.01)
*H01F 6/04* (2006.01)
*H01H 85/055* (2006.01)

(52) U.S. Cl.
CPC ............. *H01H 33/666* (2013.01); *H01F 6/04* (2013.01); *H01H 85/055* (2013.01)

(58) Field of Classification Search
CPC .... H01H 33/666; H01H 85/055; H01H 85/11; H01H 85/047; H01H 85/10; H01H 85/201; H01H 85/47; H02H 9/023; H01F 6/04
USPC .......................... 218/138–140, 146–147, 118
See application file for complete search history.

(56) References Cited

U.S. PATENT DOCUMENTS 3,684,923 A * 8/1972 Keeler, II ............. H10N 60/355 361/87
10,340,111 B2 * 7/2019 Kawai .................. H01H 85/185
11,127,555 B1 * 9/2021 Ide ...................... H01H 85/1755
11,251,008 B2 * 2/2022 Kanapady .............. H01H 69/02
2008/0190646 A1 8/2008 Folts et al.
2017/0330663 A1 * 11/2017 Bauer ........................ H01F 6/06
2021/0050171 A1 * 2/2021 Chiu .................... H01H 85/055
2022/0122799 A1 * 4/2022 Tsang ...................... H01H 69/02
2022/0159873 A1 * 5/2022 Ashworth ............ B60H 1/3202

FOREIGN PATENT DOCUMENTS

DE 19846349 A1 8/1999
JP S6439230 A 2/1989
JP 2000268700 A 9/2020
RU 2770419 C1 4/2022

OTHER PUBLICATIONS

European Search Report for corresponding European Patent Application No. 22306380 dated Feb. 17, 2023.

* cited by examiner

*Primary Examiner* — William A Bolton
(74) *Attorney, Agent, or Firm* — Greer Burns & Crain Ltd.

(57) ABSTRACT

A cryogenic fuse comprising a superconducting element arranged in a first chamber, the first chamber containing a cryogenic fluid, the cryogenic fuse being such that the superconducting element comprises a breaker initiation zone configured to determine a melting current and the first chamber is surrounded by a second chamber, placed under vacuum. The melting current or a melting time of the breakdown initiation zone may be adjusted.

10 Claims, 3 Drawing Sheets

POWER FUSE AND AIRCRAFT COMPRISING SUCH A POWER FUSE

CROSS-REFERENCES TO RELATED APPLICATIONS

This application claims the benefit of European Patent Application Number 22306380.1 filed on Sep. 21, 2022, the entire disclosure of which is incorporated herein by way of reference.

FIELD OF THE INVENTION

The present invention relates to a cryogenic fuse for opening an electrical circuit. The invention relates more particularly to a cryogenic fuse for power circuits of an electrically propelled aircraft.

BACKGROUND OF THE INVENTION

Liquid hydrogen is a cryogenic fluid that can be used as an energy source for electricity generation. Thus, for example, it is possible to use a hydrogen fuel cell to power all the flight control and communication systems of an aircraft, as well as the on-board lighting and the power supply of various accessory devices used in the aircraft. Liquid hydrogen can also be used as an energy source for the propulsion of an aircraft, by powering a fuel cell or by direct combustion, which has the advantage of only releasing water into the atmosphere. The use of hydrogen requires distribution systems between one or more production or storage tanks and consuming devices. Thus, pipes are conventionally used to convey liquid hydrogen between a storage tank and a liquid hydrogen consuming device such as, for example, a hydrogen fuel cell.

It is known that there is a need to massively reduce the production of carbon emissions, to safeguard the environment, and electric or hybrid propulsion is showing promise for this. But the conventional systems on board of an aircraft are such that the weight/electrical power ratio is not satisfactory as they are and there is therefore a need to obtain electrical systems making it possible to provide power in relation to their weight to satisfy all the constraints. This is the case for electrical fuses as well as for other aircraft power components.

It is therefore necessary to optimize the electrical power-to-weight ratio of all elements of an aircraft's propulsion system, and in particular those power components through which strong currents flow and which must have a high current breaking capacity. The situation can be improved.

SUMMARY OF THE INVENTION

It is an object of the present invention to provide a fuse with a breaking capacity compatible with the current requirements of an electrically propelled aircraft, while having weight and size characteristics compatible with flight constraints.

To this end, it is proposed a cryogenic fuse comprising a superconducting element (of the superconductor type) arranged in a first chamber, which first chamber contains a cryogenic fluid, the cryogenic fuse being configured such that:

- the superconducting element includes a breaker initiation zone configured to determine a melting current, and,
- the first chamber is surrounded by a second chamber, positioned under vacuum.

The cryogenic fuse according to the invention may comprise the following features, considered alone or in combination:

- The breaker initiation zone comprises impurities inserted into the superconducting element.
- The breaker initiation zone has a local reduction in the cross-section of the superconducting element.
- The breaker initiation zone has at least one bend in the superconducting element.
- The impurities inserted in the breaking initiation zone are aluminum or copper fragments.
- The superconducting element is in the form of a tape or a strip.
- The first chamber comprises at least one cryogenic fluid inlet opening.
- The cryogenic fuse further comprises an additional module for controlling said melting current.
- The additional module for controlling said melting current is configured to control the temperature of the cryogenic fluid present in the first chamber.
- The additional module for controlling said melting current is a controlled electromagnetic field source.

The invention also relates to a power transmission cable comprising a cryogenic fuse integrated into the cable.

Finally, another object of the invention is an aircraft comprising a cryogenic fuse as described above or comprising a power transmission cable as described above.

BRIEF DESCRIPTION OF THE DRAWINGS

The characteristics of the invention mentioned above, as well as others, will appear more clearly on reading the following description of at least one embodiment, said description being made in relation to the attached drawings, among which.

DETAILED DESCRIPTION OF THE PREFERRED EMBODIMENTS

Figure 1:
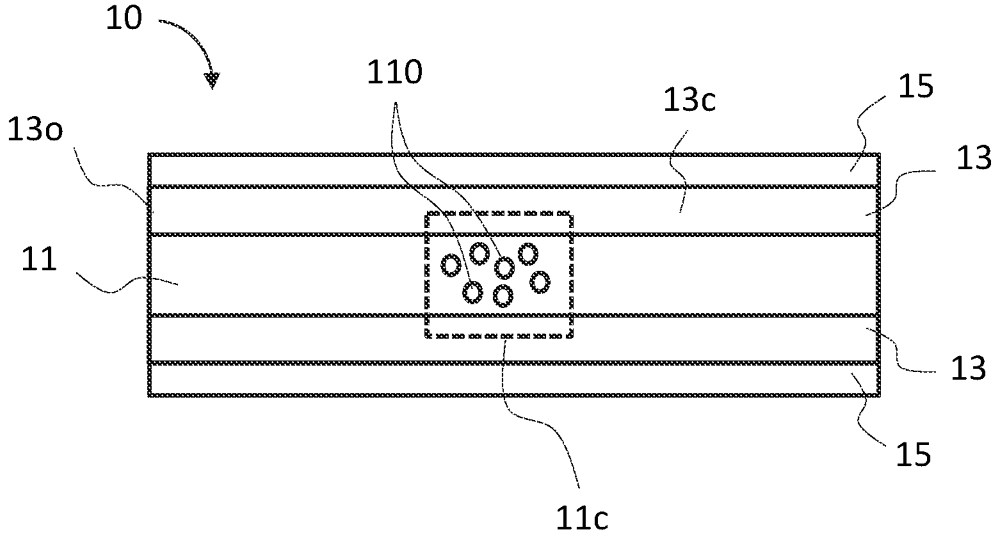
FIG. 1 schematically illustrates a cryogenic fuse according to a first embodiment.

FIG. 1 illustrates a cryogenic fuse 10 according to a first embodiment. The cryogenic fuse 10 comprises a superconducting element 11 (configured to transmit an electric current). The superconducting element 11 comprises a zone 11*c* from a superconductor material configured to predefine a melting current of the cryogenic fuse 10, i.e. a current which, when present for a predetermined time, causes the superconducting element 11 to melt, at least in the zone 11*c*. The zone 11*c* is referred to herein as the breaking or breakdown initiation zone, since it is this zone that represents the portion of the superconducting element 11 that is most brittle (or weak) with respect to an overcurrent flowing through the superconducting element 11. As with conventional fuses, the precise characteristics of the breaking initiation zone 11*c* are not detailed here and it is considered that they are defined by laboratory tests and calibrations or by feedback, before the manufacturing of the cryogenic fuse 10, depending on the currents to be cut, the surrounding conditions, the material used for the superconducting element 11, etc. Therefore, in the present description, it is considered that the cryogenic fuse 10 is configured to open the electrical circuit when a current Imax flows through it for a predetermined time T1. The corresponding Imax and T1 characteristics are further determined for each of the circuits or circuit branches of an aircraft which it is appropriate to be able to electrically isolate from the other circuits in the event of a fault occurring in that circuit or circuit branch. According to this first embodiment, the breaking initiation zone 11*c* is obtained by inserting impurities 110 in the superconducting element 11, such as copper or aluminum fragments, for instance. Advantageously, the superconducting element 11 is enclosed in a first chamber 13 filled with a cryogenic fluid 13*c*, such as liquid or gaseous dihydrogen ($H_2$). The cryogenic fluid is introduced by an opening 13*o* of the first chamber 13, which is then closed when the fuse is made as a standalone component. In order to thermally isolate the first chamber 13 from external temperature, a second chamber 15, placed under vacuum, surrounds the first chamber 13. According to one embodiment, the vacuum in said second chamber 15 is created (obtained) during the manufacture of the fuse. According to an alternative embodiment, the vacuum in the second chamber 15 is obtained prior to powering up the electrical circuit(s) concerned by the cryogenic fuse 10, by means of dedicated equipment such as a vacuum pump. According to an embodiment, the superconducting element 11 is implemented as a standalone component comprising means for connection to a superconductive conductor to be protected by fuse.

Advantageously, and according to another embodiment, the superconducting fuse 10 can be integrated directly into a cryogenic cable also comprising a first chamber arranged around a superconducting conductor and a second chamber, under vacuum, surrounding said cable first chamber. Such a configuration simplifies manufacturing and assembly operations by limiting the number of connection points between a cryogenic fuse and cryogenic power conductors. It also saves a lot of weight.

Furthermore, as the cryogenic fuse 10 is cooled in the same way as the inner conductor of the cryogenic superconducting cable, the DC resistance of the cryogenic fuse 10 is almost zero. As a result, the efficiency gain is very high compared to a conventional fuse since the power loss in the cryogenic fuse is very low.

In addition, the insulation provided by the vacuum second chamber 15 allows the generation of the arc to be controlled after a fault has occurred and the cryogenic fuse 10 has broken. Thus, no additional system or material is required to dampen the effects of the generated arc.

Figure 5:
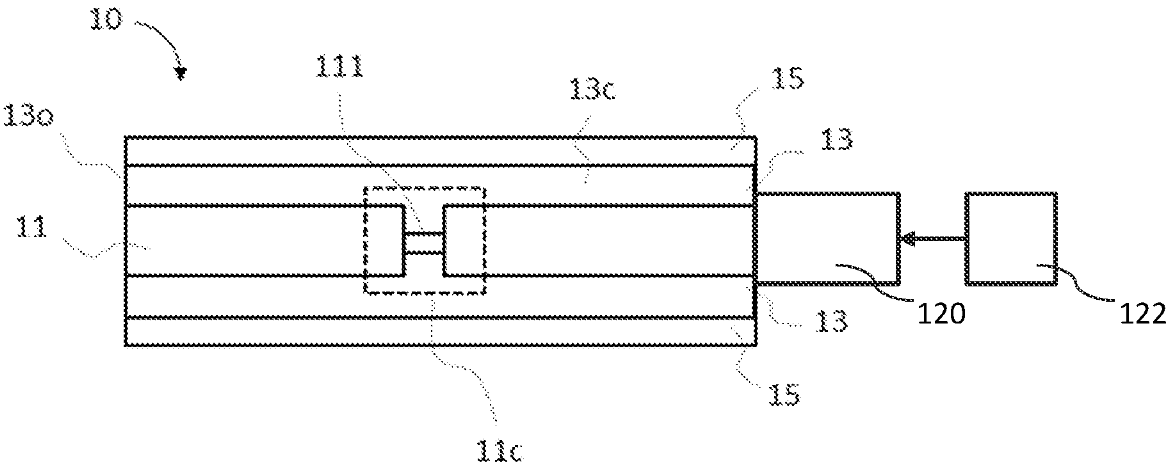
FIG. 5 schematically illustrates a cryogenic fuse according to another embodiment; and, FIG. 6 schematically illustrates a cryogenic fuse according to another embodiment.

In one embodiment, the first chamber 13 containing the cryogenic fluid 13*c* may be connected to a cryogenic fluid supply system of the aircraft, at its opening 13*o*. According to another embodiment represented in FIG. 5, the cryogenic fuse 10 may have a dedicated source of cryogenic fluid 120, such as a cryocooler, connected to the opening 13*o* of the first chamber 13.

Figure 6:
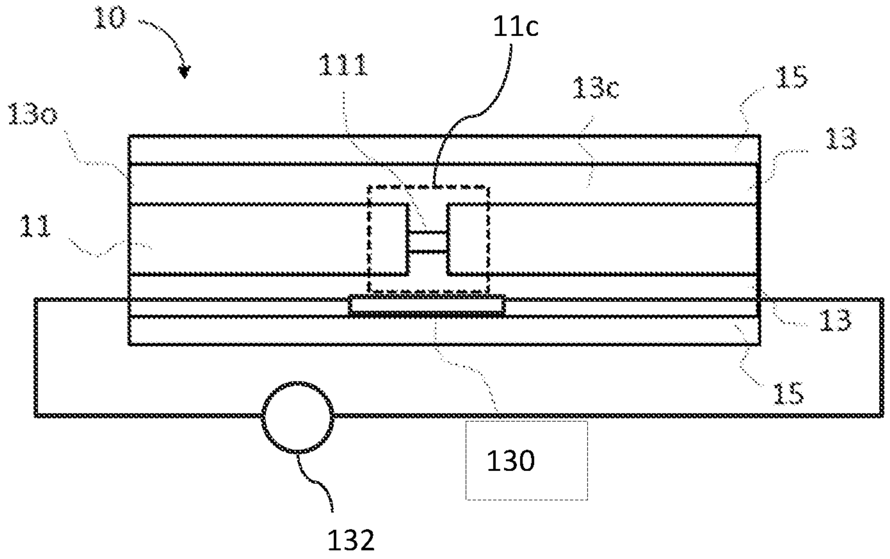

The fuse rating requirements are very diverse in aircraft systems, and it may be useful to have an adjustable value for the fuse current of a given fuse. Advantageously, the melting current of the cryogenic fuse 10 is controlled by monitoring the temperature of the cryogenic fluid present in the first chamber 13. To that end, the cryogenic fluid supply system of the aircraft, or the dedicated source of cryogenic fluid 120, is connected to a module 122 for controlling the temperature of the cryogenic fluid (represented in FIG. 5). In one embodiment represented in FIG. 6, the melting current of the cryogenic fuse 10 is controlled by positioning a magnetic field source 130 (connected to an AC generator 132) in the vicinity of the breaking initiation zone 11*c*, and the magnetic field generated in this zone allows the melting current to be adjusted. This is particularly advantageous for main circuit branches of an aircraft, considering for example that the total take-off current of the aircraft can be up to three times the nominal current consumed by the same aircraft in cruise flight mode.

It is thus advantageously possible to modulate the breaking current of a fuse of a specific branch of an aircraft circuit as a function of different flight phases such as, for example, take-off, cruise flight, landing or an emergency situation.

Figure 2:
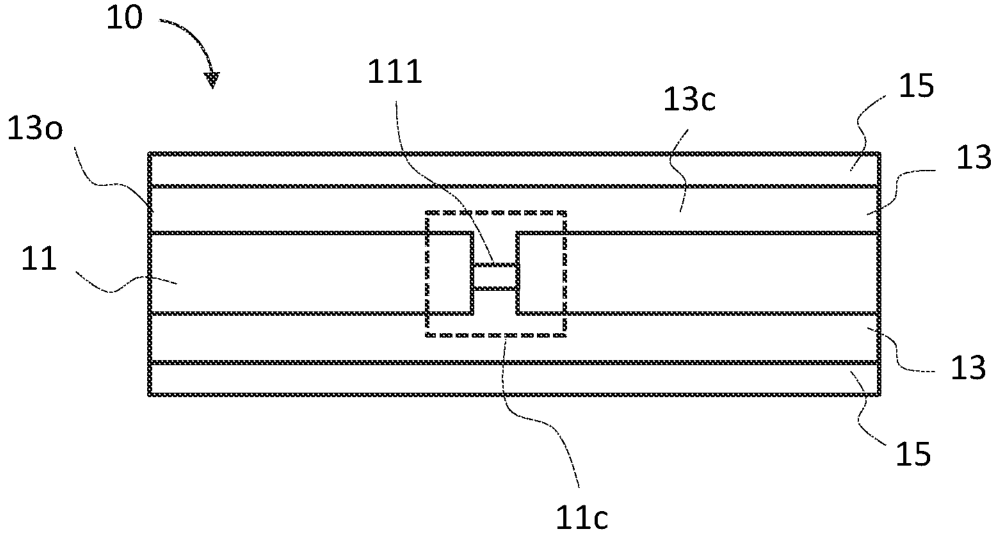
FIG. 2 schematically illustrates a cryogenic fuse according to a second embodiment.

FIG. 2 illustrates a second embodiment of the cryogenic fuse 10, according to which the fracture initiation zone is no longer obtained by inserting impurities in the superconducting material, but by a local reduction 111 in (i.e. a calibrated narrowing of) the cross-section of the superconducting element 11.

The other features remain unchanged.

Figure 3:
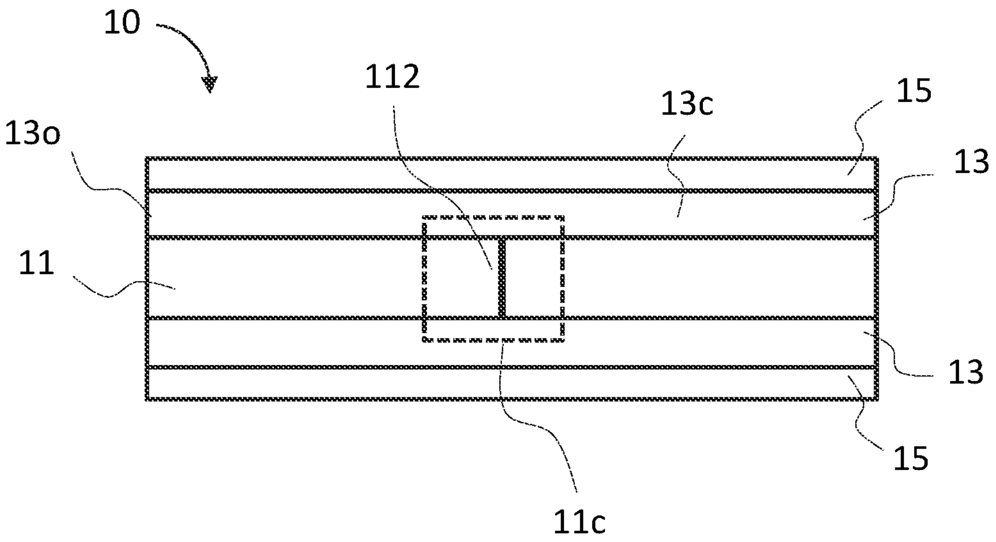
FIG. 3 schematically illustrates a cryogenic fuse according to a third embodiment.

FIG. 3 illustrates a second embodiment of the cryogenic fuse 10, according to which the breaking initiation zone is no longer obtained by inserting impurities into the superconducting material, but by arranging at least one bend 112 (i.e. one transverse calibrated plus) in the superconducting element 11.

Again, the other features remain unchanged.

Any of the three different embodiments in which the breaking initiation zone is respectively obtained by impurities inserted in the superconducting element, by reduction of the section of the superconducting element 11 or by at least one calibrated bend in the superconducting element 11, in the breaking initiation zone 11*c*, may comprise additional means for controlling and adjusting the melting current or melting time by adjusting the cryogenic fluid temperature, a magnetic field in the breaking initiation zone, or both.

Figure 4:
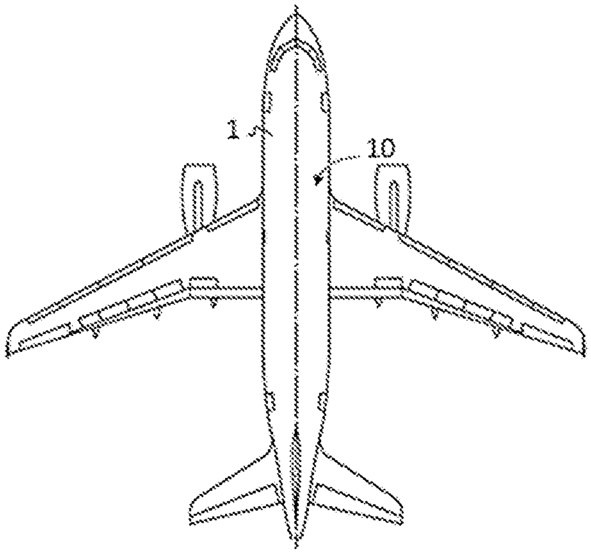
FIG. 4 schematically illustrates an aircraft comprising at least a cryogenic fuse as illustrated on FIG. 1, FIG. 2 or FIG. 3.

FIG. 4 illustrates an aircraft 1 which comprises at least one cryogenic fuse as the cryogenic fuse 10, implemented as a standalone component or being part of a cryogenic power circuit, for instance integrated in a cryogenic power cable. This allows to take benefit of the advantages described here-above and related to such a cryogenic fuse, onboard of an aircraft.

The systems and devices described herein may include a controller or a computing device comprising a processing and a memory which has stored therein computer-executable instructions for implementing the processes described herein. The processing unit may comprise any suitable devices configured to cause a series of steps to be performed so as to implement the method such that instructions, when executed by the computing device or other programmable apparatus, may cause the functions/acts/steps specified in the methods described herein to be executed. The processing unit may comprise, for example, any type of general-purpose microprocessor or microcontroller, a digital signal processing (DSP) processor, a central processing unit (CPU), an integrated circuit, a field programmable gate array (FPGA), a reconfigurable processor, other suitably programmed or programmable logic circuits, or any combination thereof.

The memory may be any suitable known or other machine-readable storage medium. The memory may comprise non-transitory computer readable storage medium such as, for example, but not limited to, an electronic, magnetic, optical, electromagnetic, infrared, or semiconductor system, apparatus, or device, or any suitable combination of the foregoing. The memory may include a suitable combination of any type of computer memory that is located either internally or externally to the device such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. The memory may comprise any storage means (e.g., devices) suitable for retrievably storing the computer-executable instructions executable by processing unit.

The methods and systems described herein may be implemented in a high-level procedural or object-oriented programming or scripting language, or a combination thereof, to communicate with or assist in the operation of the controller or computing device. Alternatively, the methods and systems described herein may be implemented in assembly or machine language. The language may be a compiled or interpreted language. Program code for implementing the methods and systems described herein may be stored on the storage media or the device, for example a ROM, a magnetic disk, an optical disc, a flash drive, or any other suitable storage media or device. The program code may be readable by a general or special-purpose programmable computer for configuring and operating the computer when the storage media or device is read by the computer to perform the procedures described herein.

Computer-executable instructions may be in many forms, including modules, executed by one or more computers or other devices. Generally, modules include routines, programs, objects, components, data structures, etc., that perform particular tasks or implement particular abstract data types. Typically, the functionality of the modules may be combined or distributed as desired in various embodiments.

It will be appreciated that the systems and devices and components thereof may utilize communication through any of various network protocols such as TCP/IP, Ethernet, FTP, HTTP and the like, and/or through various wireless communication technologies such as GSM, CDMA, Wi-Fi, and WiMAX, is and the various computing devices described herein may be configured to communicate using any of these network protocols or technologies.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An aircraft comprising:

a cryogenic fuse comprising:

a superconducting element arranged in a first chamber, the first chamber containing a cryogenic fluid, wherein said superconducting element includes a breakdown initiation zone configured to determine a melting current, wherein said first chamber is surrounded by a second chamber, placed under vacuum, and, wherein said cryogenic fuse further comprises an additional module for adjusting said melting current or for adjusting a melting time of said breakdown initiation zone.

2. The aircraft according to claim 1, wherein said breakdown initiation zone comprises impurities inserted in said superconducting element.

3. The aircraft according to claim 2, wherein said impurities comprise aluminum or copper fragments.

4. The aircraft according to claim 1, wherein said breakdown initiation zone has a local reduction in a cross-sectional area of the superconducting element.

5. The aircraft according to claim 1, wherein said breakdown initiation zone has at least one bend in said superconducting element.

6. The aircraft according to claim 1, wherein the superconducting element is in a form of a strip or a tape.

7. The aircraft according claim 1, wherein the first chamber comprises at least one inlet opening for said cryogenic fluid.

8. The aircraft according to claim 1, wherein said additional module for controlling said melting current is configured to control a temperature of said cryogenic fluid.

9. The aircraft according to claim 1, wherein said additional module for controlling said melting current is a controlled electromagnetic field source.

10. The aircraft according to claim 1, further comprising:

a power transmission cable comprising:

the cryogenic fuse.

* * * * *